(12) United States Patent
Cailbault

(10) Patent No.: US 6,634,485 B1
(45) Date of Patent: Oct. 21, 2003

(54) OBJECT EVACUATION CHUTE, MODULE INCORPORATING SUCH CHUTES AND OBJECT SORTING INSTALLATION EQUIPPED THEREWITH

(75) Inventor: Christian Cailbault, Le Chateau d'Olonne (FR)

(73) Assignee: Automatisme Nouveau Organisation, Olonne sur Mer (FR)

( * ) Notice: Subject to any disclaimer, the term of this patent is extended or adjusted under 35 U.S.C. 154(b) by 0 days.

(21) Appl. No.: 09/512,279

(22) Filed: Feb. 24, 2000

(30) Foreign Application Priority Data

Feb. 25, 1999 (FR) .............................. 99 02360

(51) Int. Cl.⁷ .......................... B65G 11/08; B65G 11/20
(52) U.S. Cl. ................ 198/417; 198/534; 193/27; 193/32
(58) Field of Search .............. 198/534, 417; 193/27, 32, 46

(56) References Cited

U.S. PATENT DOCUMENTS

| | | | | |
|---|---|---|---|---|
| 2,461,290 A | * | 2/1949 | Maynard et al. ............ | 198/400 |
| 3,187,872 A | * | 6/1965 | Hill et al. .................... | 193/32 |
| 3,223,215 A | * | 12/1965 | Budjinski et al. ............ | 193/32 |
| 3,656,605 A | * | 4/1972 | Gess ........................... | 198/402 |
| 4,334,603 A | * | 6/1982 | Carter et al. ................. | 193/32 |
| 4,750,602 A | * | 6/1988 | Souda ......................... | 193/32 |
| 5,197,728 A |   | 3/1993 | Radtke | |

FOREIGN PATENT DOCUMENTS

| EP | 631 827 | 1/1995 |
|---|---|---|
| GB | 1 593 636 | 7/1981 |

\* cited by examiner

Primary Examiner—Christopher P. Ellis
Assistant Examiner—Mark A. Deuble
(74) Attorney, Agent, or Firm—Browdy and Neimark, P.L.L.C.

(57) ABSTRACT

In an object evacuation chute for an object sorting installation, a guide duct extends between a horizontal inlet and an outlet defined on a lateral face and at least one elastic deflector is disposed in the duct to push an object toward a guide wall of the duct. The duct advantageously has a base for turning the objects.

18 Claims, 2 Drawing Sheets

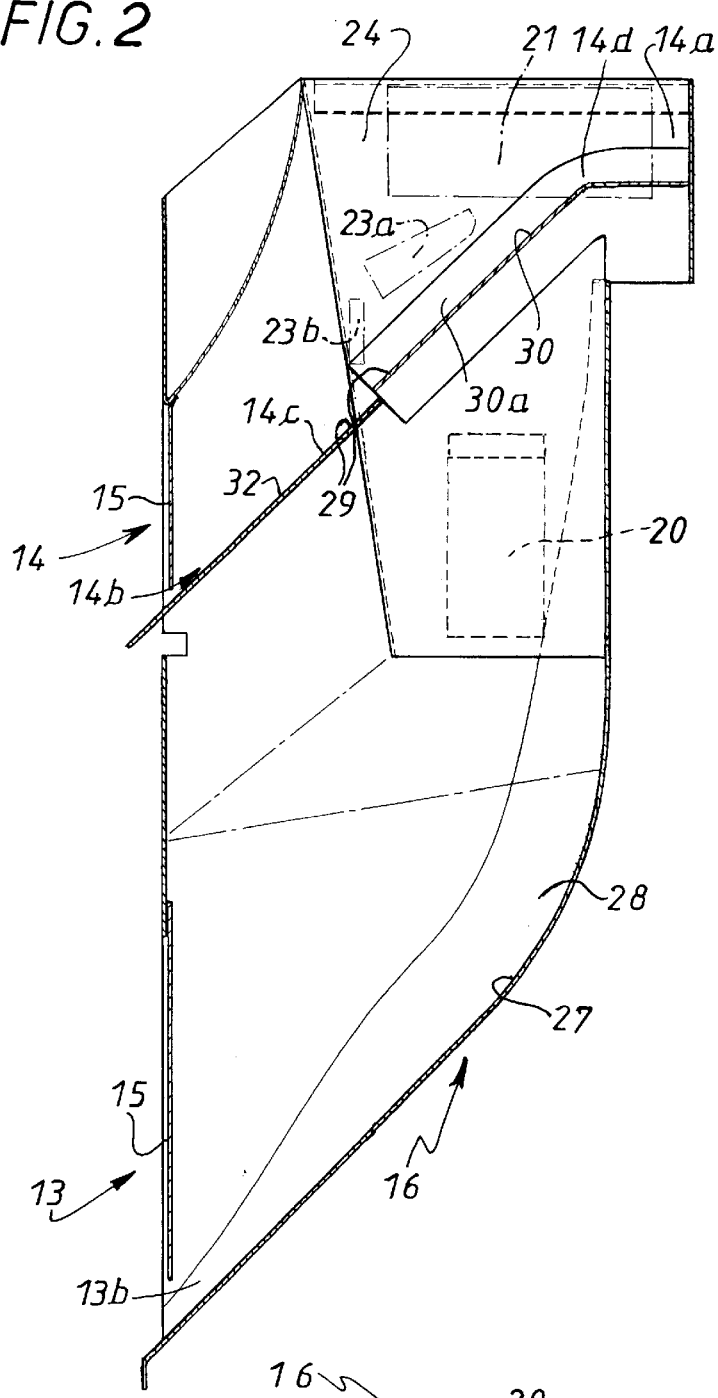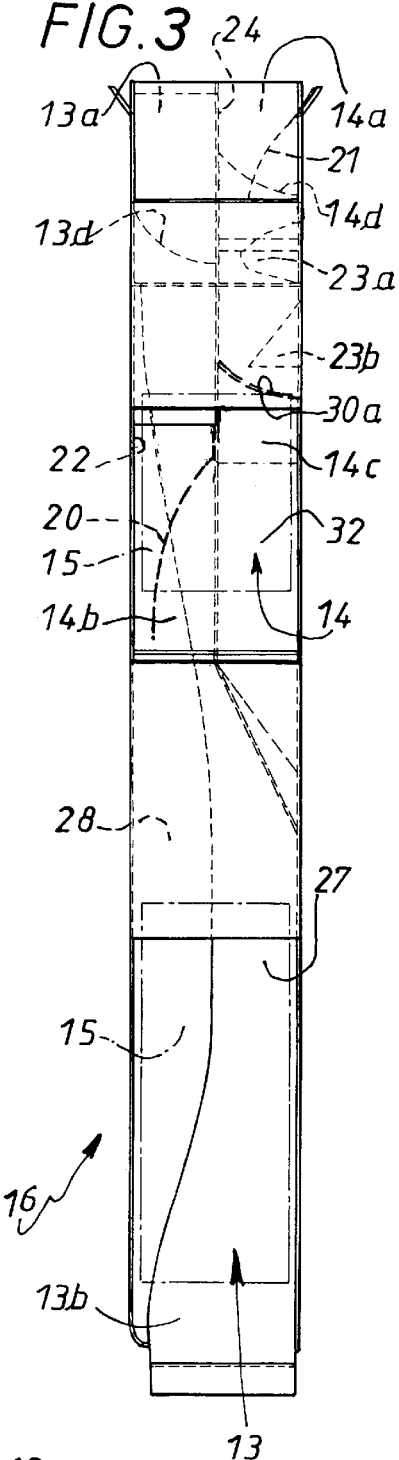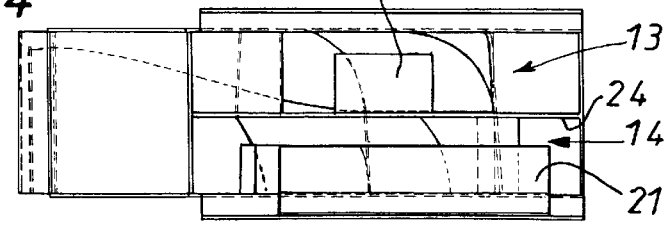

OBJECT EVACUATION CHUTE, MODULE INCORPORATING SUCH CHUTES AND OBJECT SORTING INSTALLATION EQUIPPED THEREWITH

BACKGROUND OF THE INVENTION

1. Field of the Invention

The invention relates to a chute for evacuating objects distributed by a sorter conveyor; it relates more particularly to an improvement to a chute of the above kind which damps the fall of the objects and thereby prevents them being damaged and guides them better, the object being ejected flat so that, if required, objects can be stacked automatically in a receptacle extending the outlet.

The invention also relates to an object evacuation chute module including at least two chutes as defined above with outlets at different levels. Finally, it relates to any object sorting installation equipped with such chutes or modules.

2. Description of the Prior Art

A prior art installation for sorting objects groups wallets or small packets in different receptacles according to their destination. For example, an installation of the above kind is routinely used in photograph processing centers for handling wallets containing developed photographs and their negatives, to be dispatched to customers or outlets. A gripper conveyor circulates the packs along a predetermined closed loop path. The grippers travel above a plurality of evacuation chutes. Opening a gripper at a given point on its path drops the object into a selected chute and routes the object to a corresponding receptacle.

One such system is described in European patent 0 437 501, for example.

The receptacles are often sacks in which the objects accumulate loose.

Some users prefer to employ receiving hoppers and in this case, if the objects are all substantially the same shape and size, it is advantageous to orient them in the evacuation chutes so that they can be stacked in an orderly fashion in the receiving hoppers.

European patent 0 631 827 describes an arrangement of chutes which in principle enables objects to be stacked flat and in an ordered fashion in receiving hoppers at the outlets from the chutes. One chute described in the above document has a vertical part in which the object falls freely and an outlet chicane consisting of planes inclined toward each other to form a kind of elbow bend. The chicane directs the object toward the outlet at the end of its drop. The shape of a chute of the above kind in principle enables orderly stacking in a receptacle of suitable predetermined shape. Nevertheless, a certain percentage of errors occurs in stacking. In other words, from time to time, an object is not placed correctly in the stack being formed. Also, falling freely in the chute can damage a fragile object when it impacts on the chicane.

The invention proposes a new type of chute which has proved to be more effective for sorting objects of the above kind, by absorbing impacts in the chute and making orderly stacking more reliable.

SUMMARY OF THE INVENTION

More specifically, the invention provides a chute for evacuating objects distributed by a sorter conveyor, the chute having an inlet defined by a substantially horizontal opening, an outlet at a lower level than the inlet, a guide duct connecting the inlet to the outlet and having a transverse guide wall and at least one elastic deflector in the duct and having a mobile part which faces the transverse guide wall of the duct in order to push an object engaged therein momentarily toward the transverse guide wall.

By "transverse wall" is meant one of the two walls of the chute which is globally transverse to the direction of movement of the object conveyed by the grippers. A chute of this kind therefore essentially has two spaced transverse walls and a back wall joining the two transverse walls.

A deflector advantageously consists of an elastic flexible blade fixed by one side to the duct and projecting downward into the duct and toward the transverse guide wall so that the elastic blade constitutes a flexible obstacle in the duct adapted to retract elastically when an object passes it and to push the object toward the transverse guide wall.

This retards the movement of the object and obliges the object to follow said transverse guide wall.

In one embodiment of the invention a guide duct of the above kind has a back wall which is globally curved in the direction of evacuation of the object. This embodiment is particularly suitable when the outlet is a very long way from the inlet.

In another embodiment of the invention a guide duct according to the invention has a back wall that is globally rectilinear in the direction of evacuation of the object. The back wall can have an upstream section merging with the transverse guide wall through a curved surface portion and a downstream section in the form of an inclined plane extending to the outlet. This embodiment is particularly suitable when the distance between the inlet and the outlet is not too great.

In both cases, the width of the duct can advantageously become greater in the upstream to downstream direction. Consequently, by combining the previous two embodiments, a module can include at least two chutes having outlets the same width at different levels. In a module of this kind two chutes are disposed side-by-side with their respective entries in the same plane in the upper part of the module and their respective outlets at different levels, one above the other.

Of course, the invention also relates to a module of the above kind and to any object sorting installation including a plurality of evacuation chutes having the features defined above or a plurality of chute modules defining at least two outlet levels.

The invention will be better understood and other advantages of the invention will become more clearly apparent in the light of the following description of an object evacuation chute module including two evacuation chutes of the above kind, which description is given by way of example only and with reference to the accompanying drawings.

BRIEF DESCRIPTION OF THE DRAWINGS

FIG. 2 is a diagrammatic view in section taken along the line II—II in FIG. 1.

FIG. 3 is a front elevation view of the module as seen in the direction of the arrow III in FIG. 1.

FIG. 4 is a plan view of the same module.

DETAILED DESCRIPTION OF THE PREFERRED EMBODIMENT

Figure 1:
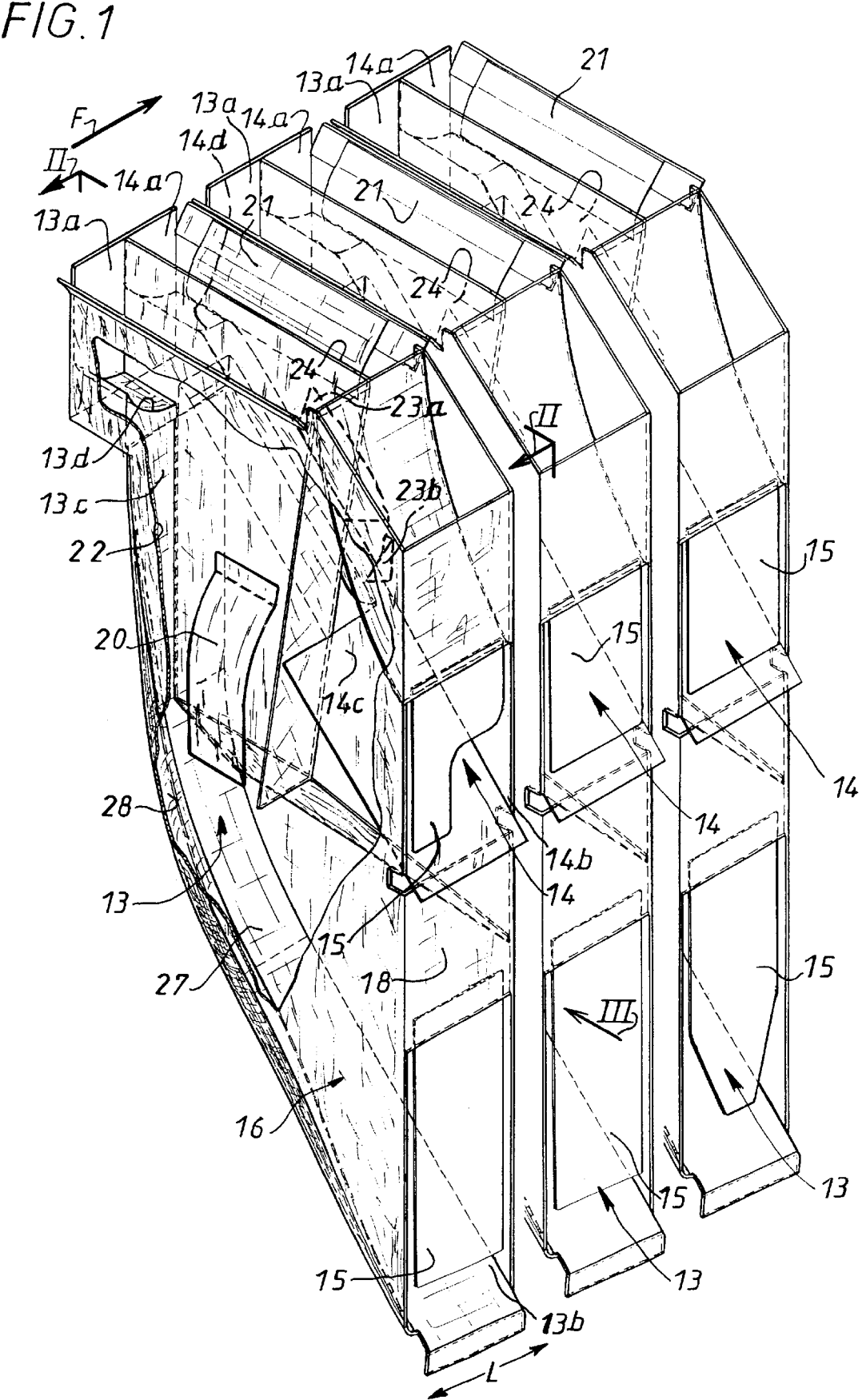
FIG. 1 is a general perspective view of the module in question.

The drawings show an object evacuation chute module 11 consisting of two associated chutes 13, 14 defined in a common casing 16 that is relatively flat relative to the direction in which the objects are moved by a conveyor (not shown) transporting the objects above a row of such modules. The direction of movement is indicated by the arrow F in FIG. 1. FIG. 1 shows a few adjoining modules. A set of such modules therefore defines a plurality of locations at which objects can be selectively released by commanding corresponding grippers of the conveyor, releasing an object causing it to drop into a selected chute 13 or 14 to sort the objects, for example to group objects according to their destination.

The chutes in each module are side-by-side. Each chute 13, 14 has an inlet 13a, 14a defined by a substantially horizontal opening and a corresponding outlet 13b, 14b at a level lower than the inlet. There is a guide duct 13c, 14c between each inlet and the corresponding outlet. Each outlet is on the front panel 18 of the module, i.e. the accessible vertical face thereof against which are placed receiving racks in which the objects can accumulate in an orderly fashion, stacked flat one on top of another. Note that in the module shown the two outlets 13b, 14b are defined by two rectangular openings at different levels occupying substantially all of the length L of the front panel 18. Flexible panels 15, made from an elastomer material, for example, are attached to the top edges of the openings. They hang freely in front of the outlets to retard the objects. Some flexible panels can be cut out in the manner shown; the shape of the cut contour is determined according to the shape and size of the objects selected.

The two chutes in the module are not the same length. For convenience hereinafter the long chute 13 means the chute connecting the inlet 13a to the lower outlet 13b and the short chute 14 means the chute connecting the inlet 14a to the higher outlet 14b. Note, however, that the principle of the invention can be applied to a more complex module grouping more than two chutes with outlets at different levels on the front panel and inlets all disposed side-by-side and horizontally in the upper part of a module of this kind. Conversely, the invention can provide a single chute (with only one outlet level). In all cases, a plurality of chutes of the above kind can be disposed side-by-side to define a receiving system similar to that shown in FIG. 1 but with only one row of outlets.

In the module 11, each of the above guide ducts 13c, 14c connecting a horizontal inlet at the top to an outlet at the bottom includes at least one flexible and elastic deflector 20, 21 which has a mobile part which faces a transverse wall of the duct. This particular transverse wall is referred to as the "guide wall". Thus each chute has two approximately vertical transverse walls and the flexible deflector is fixed to one transverse wall and cooperates with the other transverse wall, i.e. the "guide" transverse wall.

In the example, the transverse guide wall 22 of the long chute 13 constitutes the rear wall of the module 11 relative to the direction of movement of the objects above the latter and said guide wall 24 of the short chute consists of the wall separating the two chutes in the module. As will be described later, the separator wall is bent at a right angle inside the module and merges with the rear wall of the module, which defines an enlargement of the downstream part of the short guide duct 14c extending as far as the outlet 14b, which occupies substantially all of the length of the module. Similarly, it can be seen that the long guide duct 13c has a narrow upstream part extending substantially half the length L of the module and which merges with an enlarged downstream part below the outlet 14b of the short guide duct. This downstream part extends as far as the lower outlet 13b occupying substantially all the length of the module.

A deflector 20 or 21 of the above kind consists of an elastic, supple and flexible blade fixed at one side to the corresponding duct and projecting downward into the duct and toward the corresponding transverse guide wall 22 or 24.

To be more precise, the guide duct 13c has a deflector 20 in the form of an elastic blade which is fixed to the transverse wall which separates the two ducts, projects into the duct 13c and is inclined downwardly toward said guide wall 22 of the duct 13c. In a similar fashion, the guide duct 14c has at least one deflector 21 in the form of an elastic blade which is fixed to the front transverse wall of the module, projects into the duct 14c and is inclined downward toward the guide wall 24 of the duct 14c, which also constitutes the separation between the two guide ducts. The deflector 20 is in the duct 13c, slightly above its bottom half, and the deflector 21 is preferably in the immediate vicinity of the opening defining the inlet 14a of the duct 14c. The latter has two other deflectors 23a, 23b at lower levels in the duct. The deflector 23a is mounted like the deflector 21 but is farther downstream in the chute and the edge by which it is fixed to the front transverse wall of the module is inclined in the direction of downward movement of the object, unlike the fixing edges of the deflectors 20 and 21, which are horizontal. The deflector 23b is at a lower level than the deflector 23a. Its fixing edge is vertical and its projecting part is triangular; its pointed free end is directed toward the guide wall 24 of the short chute. The deflectors 23a and 23b are not indispensable; they can be installed in the short chute or not according to the nature (weight, dimensions) of the objects to be processed.

Each elastic blade 20, 21, 23a or 23b constitutes a flexible obstacle in the corresponding duct which can retract elastically as an object passes and which pushes the object toward the corresponding transverse guide wall 22, 24.

Each guide duct has a turning base 13d, 14d at the top, in the vicinity of the corresponding inlet 13a, 14a. The base is at a lower level than the inlet and faces part only of its surface. The base 13d is curved upward and on the same side as the transverse guide wall 22 of the duct 13c. Similarly, the base 14d is curved upward and on the same side as the transverse guide wall 24 of the duct 14c. The rounded shape of the base inclines an object or pack so that its upper edge is already in contact with the rear wall, i.e. the guide wall, even before it begins to be turned, which is favorable to the remainder of its travel.

The object turns substantially 90° in the long chute and approximately 45° in the short chute 14.

The guide duct 13c of the long chute has a back wall 27 between the base 13d and the outlet 13b which is globally curved in the direction of evacuation of an object. The sloping lower portion of this back wall, i.e. that nearest the outlet 13b, is substantially flat. However, this back wall merges with said transverse guide wall 22 through a curved surface portion 28.

Consequently, the overall shape of the guide duct 13c somewhat resembles a pelota racket, at least in so far as the shape of the guide wall is concerned. This shape helps to maintain contact between the object and the guide duct.

The guide duct 14c of the short chute 14 has a back wall 29 which is globally rectilinear in the direction of evacuation of the object. From the base 14d it is inclined at about 45°. However, this back wall has an upstream section 30 which merges with the transverse guide wall 24 of the short chute through an ascending curved surface portion. The downstream section 32 is flat and inclined and extends as far as the outlet 14b. As previously mentioned, the duct is enlarged by a right-angle bend in the wall 24 which merges with the wall 22 so that the lowest terminal part of the back wall 29 occupies substantially all of the length L of the module. As can be seen in the drawings, this enlargement of the long chute in the upstream to downstream direction is progressive; it is the result of the shape of the curved surface portion 28.

Operation is extremely simple and is obvious from the foregoing description.

When an object is released above the inlet 13a of the long chute 13, it encounters the base 13d almost immediately and turns 90° before dropping into the duct. The upper edge of the object is therefore in contact with the upper part of the guide wall as soon as it reaches the base, because of the presence of the rounded base 13d. It remains in contact with this wall after turning and never falls freely without being guided. As it drops it encounters the deflector 20 which retards its movement and at the same time holds it in contact with the transverse guide wall 22, which is concave, as can be seen in the drawings. The object is therefore constrained to follow this slightly concave surface (because its upper edge is in contact with it) and slides progressively onto the sloping flat terminal part of the duct as far as the outlet 13b. The flexible flap 15 retards the ejection of the object which has just assumed a flat position and is stacked in a receptacle extending the outlet 13b.

If an object is released above the inlet 14a of the short chute 14 it also encounters the base 14d which begins to turn it in the direction of the outlet at the same time as the deflector 21 pushes it toward the transverse guide wall 24 of the short chute. The object continues to move through the narrow part of the duct, in which it is at a slant with its upper edge pressed against the transverse guide wall 24; it rests on the enlarged inclined plane when it enters the enlarged part of the guide duct 14c. It is then evacuated via the outlet 14b and is stacked flat in a receptacle extending the latter. As previously, the object is held in contact with the guide duct throughout its travel and does not fall freely. It is retarded by the deflector(s). The operation as just described concerns the processing of flat objects which can be stacked, preferably having an approximately rectangular contour, for example cases, wallets or boxes. However, the chutes described can process objects of different and varying shapes, and even relatively fragile objects.

What is claimed is:

1. A chute for evacuating objects distributed by a sorter conveyor, said chute having an inlet defined by a substantially horizontal opening, an outlet at a lower level than said inlet, a guide duct connecting said inlet to said outlet and having a transverse guide wall and at least one elastic deflector in said duct and having a mobile part which faces said transverse guide wall of said duct in order to push an object engaged therein momentarily toward said transverse guide wall, wherein said guide duct has a turning base in the vicinity of said inlet, at a level lower than that of said inlet and facing a part of said inlet.

2. The chute claimed in claim 1 wherein said at least one deflector comprises an elastic flexible blade fixed by one side to said duct and projecting downward into said duct and toward said transverse guide wall so that said elastic blade constitutes a flexible obstacle in said duct adapted to retract elastically when an object passes it and to push said object toward said transverse guide wall.

3. The chute claimed in claim 1 wherein said base is curved upward on the same side as said transverse guide wall.

4. The chute claimed in claim 1 wherein said guide has a back wall which is globally rectilinear in the direction of evacuation of said object.

5. The chute claimed in claim 4 wherein a lower portion of said back wall extends to said exit and is substantially in the form of an inclined plane.

6. The chute claimed in claim 4 wherein said back wall merges with said transverse guide wall via a curved surface portion.

7. The chute claimed in claim 1 wherein said guide duct has a back wall which is globally curved in the direction of evacuation of said object.

8. The chute claimed in claim 7 wherein said back wall has an upstream section merging with said transverse guide wall via a curved surface portion and a downstream section in the form of an inclined plane extending to said outlet.

9. The chute claimed in claim 1 wherein said duct widens in the upstream to downstream direction.

10. The chute claimed in claim 1 including a plurality of said deflectors disposed at different levels in said duct along the travel of an object and adapted to push each object toward said transverse guide wall.

11. An object evacuation chute module including at least two chutes as claimed in claim 1 disposed side-by-side with their respective inlets side-by-side in an upper part of said module and their respective outlets at different levels, one above the other.

12. The module claimed in claim 11 wherein said guide duct between an inlet and the lowest outlet has a back wall which is globally curved in the direction of evacuation of an object.

13. The module claimed in claim 11 wherein said guide duct between an inlet and the highest outlet has an inclined back wall which is globally rectilinear in the direction of evacuation of an object.

14. An installation for sorting objects including a plurality of chutes as claimed in claim 1 disposed side-by-side.

15. An installation for sorting objects including a plurality of evacuation chute modules as claim 11 disposed side-by-side.

16. The chute claimed in claim 1 wherein said guide duct has an upstream part that extends from said inlet and a downstream part that extends from said upstream part to said outlet and that is enlarged relative to said upstream part.

17. A chute for evacuating objects distributed by a sorter conveyor, said chute having an inlet defined by a substantially horizontal opening, an outlet at a lower level than said inlet, and a guide duct connecting said inlet to said outlet and having a transverse guide wall wherein said guide duct has a turning base in the vicinity of said inlet, at a level lower than that of said inlet and facing a part of said inlet, wherein said guide duct has an upstream section with a curved surface portion, and a flat downstream section that follows said upstream section, said guide duct being enlarged abruptly between said upstream section and said downstream section.

18. A chute for evacuating objects distributed by a sorter conveyor, said chute having an inlet defined by a substantially horizontal opening, an outlet at a lower level than said inlet, and a guide duct connecting said inlet to said outlet and having a transverse guide wall wherein said guide duct has a turning base in the vicinity of said inlet, at a level lower than that of said inlet and facing a part of said inlet, wherein said guide duct has a curved surface portion and a horizontal dimension that increases progressively toward said outlet.

* * * * *